United States Patent [19]
Spalti et al.

[11] 3,949,196
[45] Apr. 6, 1976

[54] DATA CARRIER FOR USE IN DATA PROCESSING APPARATUS

[75] Inventors: Max Spalti, Mutschellen; Hans Hirzel, Hombrechtikon, both of Switzerland

[73] Assignee: Zuehlke Engineering AG, Schlieren-Zurich, Switzerland

[22] Filed: Aug. 9, 1972

[21] Appl. No.: 279,169

[30] Foreign Application Priority Data
Aug. 12, 1971 Switzerland........................ 11894/71

[52] U.S. Cl............................................ 235/61.12 R
[51] Int. Cl.² ......................................... G06K 19/00
[58] Field of Search 235/61.12 R, 61.12 N, 61.12 M, 235/61.12 C, 61.11 E, 61.11 D, 61.11 R; 179/100.2 A; 250/219 D, 219 DC

[56] References Cited
UNITED STATES PATENTS

| | | | |
|---|---|---|---|
| 1,150,793 | 8/1915 | Tallmadge.................. | 235/61.12 R |
| 2,677,285 | 5/1954 | Volk.......................... | 235/61.12 R |
| 3,604,901 | 9/1971 | Morita et al................ | 235/61.12 R |
| 3,644,715 | 2/1972 | Holderith.................... | 235/61.12 R |

Primary Examiner—Thomas J. Sloyan
Attorney, Agent, or Firm—Michael J. Striker

[57] ABSTRACT

An elongated card has a pair of longitudinally extending lateral edges located at opposite sides of and extending in parallelism with a longitudinal symmetry line of the body, and a single row of discrete indicia representing respective encoded data bits is provided on the symmetry line extending longitudinally of the carrier body.

1 Claim, 1 Drawing Figure

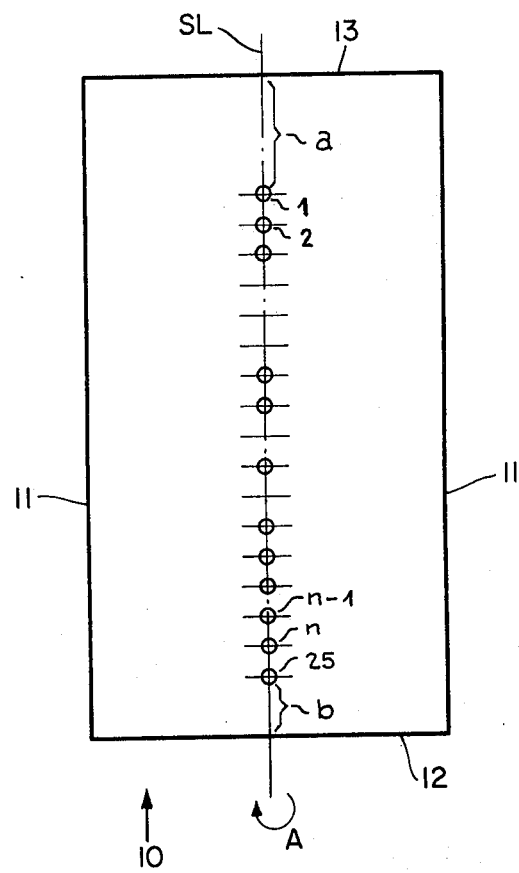

DATA CARRIER FOR USE IN DATA PROCESSING APPARATUS

BACKGROUND OF THE INVENTION

The present invention relates to a data carrier, and more particularly to a data carrier for use in data processing apparatus.

The use of data carriers which are employed in data processing apparatus is not novel. Generally speaking, it is known to use data carriers in form of tapes or ribbons, or in form of cards. Most commonly the tapes or cards are provided with discrete indicia representing encoded data bits, and these indicia are most commonly formed by punching holes of a selected configuration into the carrier body. When such a carrier is processed in the data processing apparatus, the information represented by the punched holes is retrieved mechanically, electrically or optically. Other data carriers have the information encoded thereon in ways other than by the use of punched holes, for instance by being provided with magnetic layers which are locally magnetized to form magnetized spots on the carrier. Still others have the data bits encoded thereon by printing indicia onto the carrier, for instance with regular ink or magnetic ink.

It should be understood that wherever the term data carrier or carrier body is employed in this specification and in the appended claims, the term is intended to refer to a carrier body capable of being provided with discrete indicia of whatever type, that is, either in form of punched holes, in form of magnetic spots, in form of printed or otherwise applied indicia, or whatever form may already be known from the art.

The prior art uses carriers, such as punched tape or punched cards, which are provided with the discrete indicia arranged in respective rows. In producing such a carrier, that is, in providing it with the rows of holes, it is customary to punch the holes of one row, and then to proceed to punch the holes of another row, and so on. When the carrier is inserted into data processing apparatus, for instance, a reader, the information is read in the same manner, namely row by row. This requires reference indicia, that is, special holes which are punched at a spacing corresponding to the spacing of the rows, and which determine the sequence in which the rows are scanned and read. Such reference rows must be provided over the entire length of the data carrier, be it a tape or card and evidently results in a weakening of the carrier beyond what is inherently necessary due to the position of the rows of encoded data bits. Naturally, it is not desirable to weaken the carrier more than is absolutely necessary. Aside from this, the provision of these additional reference indicia causes extra work.

There are known so-called edge-punched cards or tapes which require that they be inserted in a proper predetermined position into the reader. In other words, such cards or tapes cannot be inserted into the reader with their underside facing upwardly, when the reader is constructed to accept them only with the underside facing downwardly, because this would result in a reversal of the locations of the left-hand and right-hand margin or edges. If, on the other hand, the reader is to be capable of accepting carriers of this type even if such reversal takes place, then the reader must be so constructed as to have two scanning devices each associated with one of the sides or margins, and with electronic means being provided to switch on that scanning device located at that side at which the punched margin or edge of the carrier is located in a given instance, while the other scanning device must remain switched off, and which electronic means must be capable of reversing the switching operation if, for instance, the next carrier is inserted in a reverse relationship from the previous one. It is hardly necessary to point out that this evidently will lead to difficulties in the first instance, in which only a single scanning device is provided and in which, if the carrier is inserted in improper relationship, the scanning device will be confronted by the margin which is not punched, and that in the second instance the construction of the reader must be rather more complicated and expensive than would otherwise be the case.

Still another disadvantage of the known data carriers of the type herein discussed is that it is difficult, if at all possible, to properly read the encoded data or information if the carrier is inserted into the reader in end-for-end reversed relationship. In other words, usually such carriers have one end which is the leading end and is intended to be inserted first into the reader; if the trailing end is instead inserted first, then the difficulties exist in reading the encoded data. Attempts have been made in the art to overcome this by providing the entire encoded data twice, with one set of such data so arranged that it can be properly read by the reader if the carrier is inserted with its leading end first, and with the other set being provided in mirror-reversed relationship to the first set and so arranged that it can be properly read if the carrier is inserted with its trailing end first. Only one of the sets is, of course, read at a time. Here it will be immediately evident that each carrier must be provided with two sets of identical information, and that this results in increased expenses for the encoding process.

SUMMARY OF THE INVENTION

Accordingly, it is a general object of the present invention to overcome the disadvantages of the prior art.

More particularly, it is an object of the present invention to provide an improved data carrier for use in data processing apparatus, which is not possessed of these disadvantages.

Still another object is to provide such an improved data carrier which can be inserted into a data processing apparatus, e.g. a reader, either in a predetermined orientation or turned about its longitudinal line of symmetry through 180° with reference to this predetermined orientation, without causing any difficulties in the reading of the encoded information. In other words, the carrier according to the present invention can be inserted into the reader with its underside facing downwardly, as is normally intended, or turned through 180° about its longitudinal line of symmetry so that its underside faces upwardly.

In pursuance of these objects, and of others which will become apparent hereafter, one feature of the invention resides in a data carrier for use in data processing apparatus, which carrier, briefly stated, comprises an elongated carrier body having a pair of longitudinally extending lateral edges located at opposite sides of and extending in parallelism with a longitudinal symmetry line of the carrier body. This carrier body is provided with a row of discrete indicia representing respective encoded data bits, with the row extending longitudinally of the carrier body and being located on the symmetry line.

The symmetry line is, of course an imaginary line extending longitudinally of the carrier body exactly midway between and in parallelism with the longitudinally extending transversely spaced lateral edges of the body. It is clearly immaterial in this case whether the carrier body is turned about the symmetry line through 180°, that is whether its underside faces downwardly or outwardly, because this will not influence the relationship of the row of the discrete indicia with reference to the reader.

It is advantageous, according to a further concept of the invention, to provide the terminal indicia at the opposite ends of the row in such a manner that they represent binary information of identical type. For instance, these two terminal indicia may each be representative of an item of information conveying the fact that the respective terminal indicia is located at the terminus of the row of indicia. Furthermore, it is advantageous if the spacing of one of the terminal indicia from the nearest transverse edge of the carrier body, that is, the edge extending between and connecting the longitudinal edges, is different from the spacing between the indicia at the other end of the row, and the transverse edge to which this indicia is closest. This latter measure makes it possible to insert the data carrier according to the present invention into the reader with either one of its opposite ends leading, and still obtain proper reading of the encoded information as will be discussed subsequently.

It is also advantageous if the data carrier is longer in the direction of elongation of its longitudinal symmetry line than it is wide in direction transversely to the symmetry line. For instance, the carrier body may be rectangular. This reliably prevents the carrier body from being inserted into a reader in crosswise direction.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE is a somewhat diagrammatic plan view of a novel data carrier according to the present invention.

DESCRIPTION OF THE PREFERRED EMBODIMENTS

Discussing the drawings now in detail it will be seen that the novel data carrier according to the present invention is designated with reference numeral 10. It has the illustrated data carrier body which is rectangular, that is, elongated, and in the illustrated embodiment configurated as a card. This card has two longitudinally extending transversely spaced parallel lateral edges 11, which are connected at the opposite longitudinal ends of the card by respective transverse edges 12 and 13. The imaginary symmetry line of the carrier body, that is the line bisecting the body exactly midway between and in parallelism with the longitudinal edges 11, is identified for reference purposes with reference character SL.

In accordance with the present invention the carrier body 10 is provided with a single row of discrete indicia representing respective encoded data bits, with this row extending longitudinally with the carrier body 10 and being located on the symmetry line SL. It will be immediately evident that by locating the row of indicia in the manner just described and illustrated in the drawing, it is immaterial whether the body 10 will be inserted into a nonillustrated reader in the orientation shown in the drawing, or whether it will be turned about the symmetry line SL as indicated by the arrow A through 180°, so that the side of the body 10 which is exposed in the drawing becomes the underside and is concealed, whereas the previous underside now becomes the upper side and is exposed to view. In either case, the position of the row of indicia with reference to the reader will not be influenced, despite the fact that what previously was the right-hand longitudinal edge 11 (in the drawing) becomes the left-hand edge 11 and vice versa, if the body 10 is turned through 180° as indicated by the arrow A.

The two terminal indicia 1 and 25 at the opposite longitudinal ends of the row of indicia are in the illustrated embodiment respective reference indicia, which are provided on the carrier body 10 independently of the data-recording indicia. They are intended, for instance, to identify to the reader the beginning and the end (or vice versa, depending upon which of the edges 12 or 13 is inserted first into the reader) of the row.

According to a concept of the present invention the indicium 1 is spaced by a larger distance $a$ from the adjacent transverse edge 13 than the distance $b$ by which the indicium 25 is spaced from the adjacent transverse edge 12. Of course, the relationship of the distances $a$ and $b$ could be reversed. The point is that this makes it possible to readily construct a relatively simple reader which can discern (by determining the length of the respective distance $a$ or $b$) whether the carrier body 10 has been inserted with the edge 13 leading or with the edge 12 leading. The reader can then be provided with an electronic device which appropriately switches its operation. For instance, if the information indicia, which are designated 2 . . . n, are so arranged that the information begins with the indicium 2 and ends with the indicium $n$, that is, if the edge 13 is intended to be inserted into the reader first, then the reader will upon such insertion read along the row from the indicium 2 to the indicium n and finally be told by the indicium 25 that it has completed the reading operation. If, however, contrary to the original intent the body 10 is inserted with the edge 12 leading, the reader will determine this fact by sensing the smaller distance $b$ and will switch over to an operation in which it will begin reading from what is now the trailing end of the card, that is, again beginning at indicium 2 and ending at indicium $n$ but reading in opposite direction from the one used if the card or body 10 has been inserted with the edge 13 leading. Of course, the number of indicia 2 . . . n can be varied depending upon the information to be encoded.

The invention has very substantial advantages. In particular, it makes it possible to construct not only readers but also encoders such as punches or the like, in a very simple manner, thereby reducing the construction costs and subsequently the investment costs for such equipment. In addition, it permits the entire row of indicia to be punched or otherwise produced in a single operation, and similarly, to be read in the same manner. Evidently, this increases the speed with which the row can be produced and read, and greatly speeds the encoding and subsequent retrieval of information.

In particular, the present invention makes it possible to produce a data carrier and associated reader which are virtually fool proof in operation. This is particularly important in view of the increasing trend to the use of such data carriers and associated readers in situations where unskilled persons must manipulate them. For instance, there is a trend to using such equipment in automated parking garages, in racetrack betting polars, in certain self-circus installations and the like. Evidently, the greater speed at which information can be encoded on the carrier according to the present invention and the reliability and greater speed with which it can be read, reduces waiting times and the formation of lines by customers. Moreover, the fact that a data carrier according to the present invention can be inserted into a reader in any of the various ways discussed above without thereby disadvantageously influencing the operation of the reader, means that a virtually foolproof solution has been found. Also, the greater simplicity with which readers using the novel data carrier can be built, results in a decrease of possible malfunctions and in better protection against tampering.

It should be understood that although the present invention has been described on hand of a data carrier in form of a punch card, wherein the indicia are in form of apertures or holes, this is only by way of example and the invention is equally applicable (and intended to include) analogous data carriers, such as magnetic cards, wherein the indicia are locally magnetized area, printed cards, embossed cards, cards having areas of different opacity representing the respective indicia, tapes and the like.

It will be understood that each of the elements described above, or two or more together, may also find a useful application in other types of applications differing from the types described above.

While the invention has been illustrated and described as embodied in a data carrier for use in data processing apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art fairly constitute essential characteristics of the generic or specific aspects of the invention and, therefore, such adaptations should and are intended to be comprehended within the meaning and range of equivalence of the following claims.

What is claimed as new and desired to be protected by Letters Patent is set forth in the appended claims:

1. A data carrier for use in data processing apparatus, comprising a carrier body having a pair of lateral edges located at opposite sides of and extending in parallelism with a symmetry line of said carrier body and two spaced transverse edges each extending from one to the other of said lateral edges; and discrete indicia representing respective encoded data bits, all of said indicia being located on said symmetry line and defining a single row extending therealong, said row including a pair of terminal indicia representing identical bits of data and located at the respective opposite ends of said row adjacent a respectively associated one of said transverse edges, one of said terminal indicia being spaced from the associated transverse edge by a distance which is greater than the distance by which the other of said terminal indicia is spaced from its associated transverse edge.

* * * * *